United States Patent
Kim

(10) Patent No.: US 7,146,578 B2
(45) Date of Patent: Dec. 5, 2006

(54) METHOD FOR CREATING USER-CUSTOMIZED MENU IN A PORTABLE RADIO TELEPHONE

(75) Inventor: Ji-Young Kim, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 365 days.

(21) Appl. No.: 09/752,393

(22) Filed: Dec. 28, 2000

(65) Prior Publication Data

US 2004/0221241 A1    Nov. 4, 2004

(30) Foreign Application Priority Data

Dec. 30, 1999    (KR)    ............ 10-1999-0067189

(51) Int. Cl.
  *G06F 3/00*    (2006.01)
(52) U.S. Cl. ............... 715/866; 715/765; 715/810
(58) Field of Classification Search ........ 345/762, 345/764, 765, 776, 810, 841, 866; 455/566; 715/762, 764, 765, 776, 810, 864, 866
  See application file for complete search history.

(56) References Cited

U.S. PATENT DOCUMENTS

| | | | | |
|---|---|---|---|---|
| 5,479,476 A | * | 12/1995 | Finke-Anlauff | 455/566 |
| 5,760,768 A | * | 6/1998 | Gram | 715/747 |
| 5,821,936 A | * | 10/1998 | Shaffer et al. | 715/810 |
| 5,877,746 A | * | 3/1999 | Parks et al. | 345/156 |
| 6,624,809 B1 | * | 9/2003 | Kowaguchi | 345/169 |
| 2002/0054146 A1 | * | 5/2002 | Fukumoto et al. | 345/810 |

* cited by examiner

*Primary Examiner*—Kieu D. Vu
(74) *Attorney, Agent, or Firm*—Dilworth & Barrese LLP

(57) ABSTRACT

Disclosed is a method for creating a user-customized menu in a portable radio telephone having a menu table in which service menus for a user are stored in association with corresponding indexes. The method comprising the steps of: upon receipt of a user-customized menu creating key, switching an operating mode of the portable radio telephone to a user-customized menu creating mode; receiving a user-customized menu index in the user-customized menu creating mode; after receiving the user-customized menu index, receiving a menu index to be set as menu contents in the user-customized menu index; and after receiving the menu index, storing the menu index in association with the user-customized menu index.

9 Claims, 5 Drawing Sheets

| MAIN MENU INDEX | MAIN MENU | SUB-MENU INDEX | SUB-MENU |
|---|---|---|---|
| 1 | VOLUME CONTROL | 1 | BELL VOLUME |
| | | 2 | KEY TONE VOLUME |
| | | 3 | SPEECH VOLUME |
| 2 | UTILITY FUNCTION | 1 | BELL SELECTION |
| | | 2 | ONE-TOUCH DIAL |
| | | 3 | AUTOMATIC ANSWER |
| | | 4 | KEY-TONE LENGTH |
| | | 5 | AUTOMATIC DIAL |
| | | 6 | AREA CODE INPUT |
| 3 | SYSTEM SETUP | | |
| 4 | ALERT FUNCTION | 1 | CALL CONNECT TONE |
| | | 2 | 1-MINUTE CALL TONE |
| | | 3 | SERVICE AREA |
| 5 | CALL TIME | 1 | LAST CALL |
| | | 2 | TOTAL CALL |
| 6 | SECURITY FUNCTION | 1 | LOCK FUNCTION |
| | | 2 | PASSWORD CHANGE |
| | | 3 | EMERGENCY CALL |
| | | 4 | CALL LIST ERASING |
| | | 5 | PASSWORD SENDING |
| | | 6 | PRIVACY |
| | | 7 | MANUAL NAME SETUP |
| | | 8 | AUTOMATIC NAME SETUP |
| | | 9 | SERVICE SYSTEM |
| 7 | DISPLAY | 1 | BACKGROUND BRIGHTNESS |
| | | 2 | INITIAL SCREEN |
| | | 3 | CALCULATOR |
| | | 4 | VOCODER |
| 8 | TIME SETTING | 1 | CURRENT TIME |
| | | 2 | ALARM SETTING |
| | | 3 | ANNIVERSARY INPUT |
| | | 4 | TIME RESERVING |
| | | 5 | WORLD TIME |
| 9 | VOICE RECOGNITION | | |

FIG. 2

| USER-CUSTOMIZED MENU INDEX | USER-CUSTOMIZED MENU |
|---|---|
| 1 | BELL VOLUME(11) |
| 2 | BELL SELECTION(21) |
| 3 | ALARM SETTING(82) |
| 4 | INITIAL SCREEN(72) |
| 5 | KEY TONE VOLUME(12) |

FIG. 4

METHOD FOR CREATING USER-CUSTOMIZED MENU IN A PORTABLE RADIO TELEPHONE

PRIORITY

This application claims priority to an application entitled "Method for Creating User-Customized Menu in a Portable Radio Telephone" filed in the Korean Industrial Property Office on Dec. 30, 1999 and assigned Serial No. 99-67189, the contents of which are hereby incorporated by reference.

BACKGROUND OF THE INVENTION

1. Field of the Invention

The present invention relates generally to a portable radio telephone, and in particular, to a method for creating a user-customized menu composed of the frequently used menus.

2. Description of the Related Art

A portable radio telephone, especially a GSM (Global System for Mobile communication) mobile phone utilizing the CDMA (Time Division Multiple Access) technology, includes a SIM (Subscriber Identification Module) card in which various data including subscriber information is stored. The data stored in the SIM card includes phone numbers and network IDs as well as information needed to operate the portable radio telephone, i.e., subscriber information such as a password.

A service menu for the user of the portable radio telephone is provided by a customer service profile (CSP) function stored in the SIM card, and is displayed through the portable radio telephone according to CSP information stored in the SIM card.

Though many service menus are provided for the use of the portable radio telephone, typically only a few of the menus are frequently used by the user. In general, the menus each include their sub-menus, so that the user must press many keys in order to select a desired sub-menu. For example, referring to FIG. 2, in order to set an alarm through the portable radio telephone, the user must first select a time setting menu having a main menu index #8 out of 9 main menus. Typically, the nine main menus include: a volume control menu having a main menu index #1, a utility menu having a main menu index #2, a system setup menu having a main menu index #3, an alert menu having a main menu index #4, an air time (or call time) menu having a main menu index #5, a security menu having a main menu index #6, a display menu having a main menu index #7, a time setting menu having a main menu index #8, and a voice recognition menu having a main menu index #9. Thereafter, the user must select an alarm setting sub-menu having a sub-menu index #2 out of 5 sub-menus of the time setting menu. As shown in FIG. 2, the five sub-menus for the time setting menu #8 include: a time setting sub-menu having a sub-menu index #1, an alarm setting sub-menu having a sub-menu index #2, an anniversary input sub-menu having a sub-menu index #3, a time reserving sub-menu having a sub-menu index #4, and a world time sub-menu having a sub-menu index #5. That is, in order to select a desired menu, the user must annoyingly search the menus and thus press many keys

SUMMARY OF THE INVENTION

It is, therefore, an object of the present invention to provide a method for creating a user-customized menu composed of the most frequently used menus in a portable radio telephone.

To achieve the above and other objects, there is provided a method for creating a user-customized menu in a portable radio telephone having a menu table in which service menus for a user are stored in association with corresponding indexes. The method comprising the steps of: upon receipt of a user-customized menu creating key, switching an operating mode of the portable radio telephone to a user-customized menu creating mode; receiving a user-customized menu index in the user-customized menu creating mode; after receiving the user-customized menu index, receiving a menu index to be set as menu contents in the user-customized menu index; and after receiving the menu index, storing the menu index in association with the user-customized menu index.

BRIEF DESCRIPTION OF THE DRAWINGS

The above and other objects, features and advantages of the present invention will become more apparent from the following detailed description when taken in conjunction with the accompanying drawings in which:

FIG. 2 is a diagram illustrating a menu table of the portable radio telephone by way of example;

FIG. 4 is a diagram illustrating a user-customized menu table according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
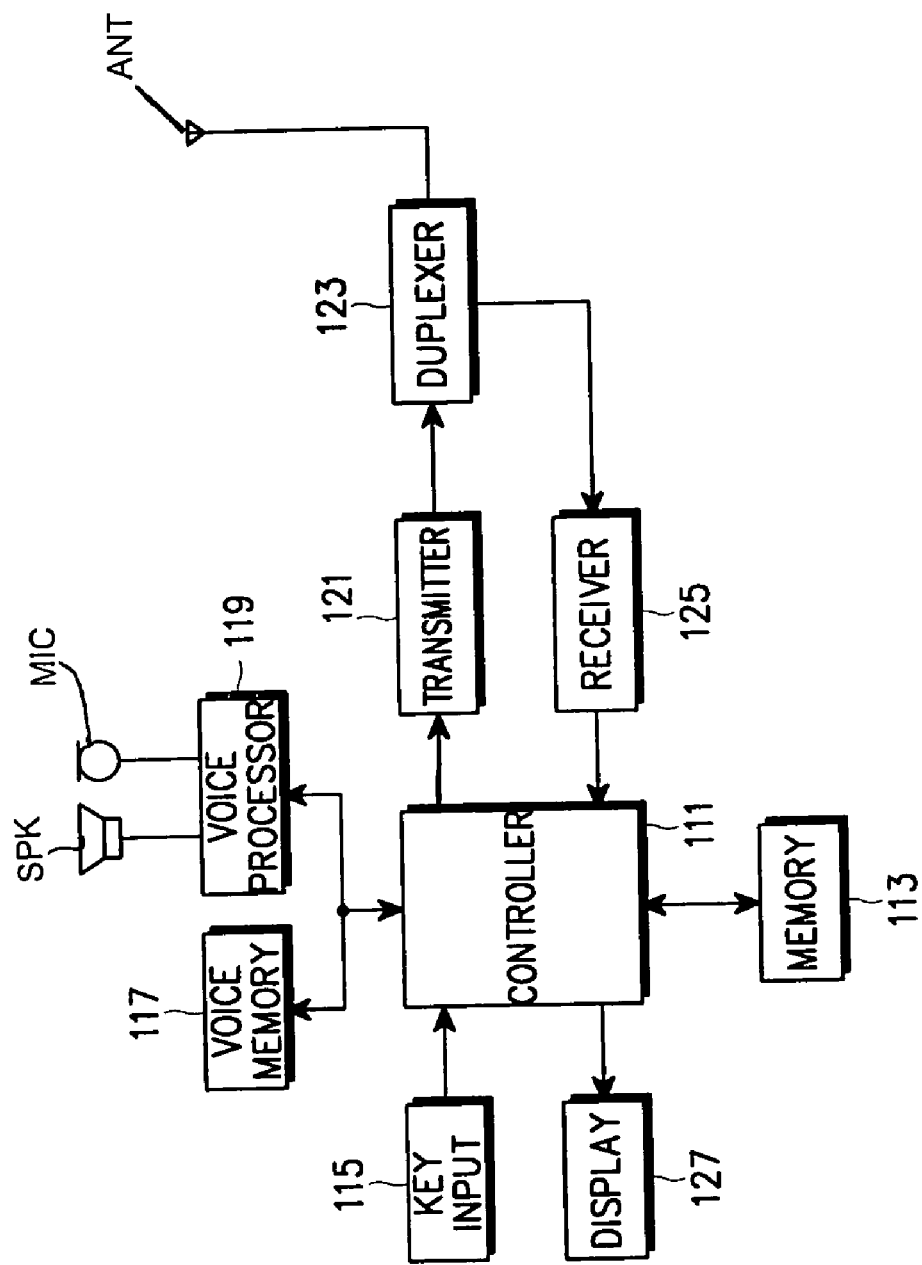
FIG. 1 is a block diagram illustrating a portable radio telephone to which the present invention is applicable.

FIG. 1 shows a block diagram of a portable radio telephone to which the present invention is applicable.

Referring to FIG. 1, a controller 111 controls the overall operation of the portable radio telephone. A memory 113 stores a control program of the portable radio telephone and control data generated from the controller 111. Particularly, in an embodiment of the present invention, the memory 113 stores service menu information registered in the SIM card and a user-customized menu created by the user. A key input unit 115 includes at least a plurality of alphanumeric keys, a MENU key and a SEND key, and generates a key signal according to a key pressed by the user. The generated key signal is provided to the controller 111.

A voice memory 117 stores a plurality of voice messages. A voice processor 119, under the control of the controller 111, converts the voice message read out from the voice memory 117 to an analog voice signal and outputs the converted voice signal through a speaker SPK. Further, the voice processor 119 converts an analog voice signal input by the user through a microphone MIC to a digital voice signal and demodulates a voice signal received from the other party.

A transmitter 121 modulates a signal provided from the controller 111 into a radio signal and provides the modulated radio signal to a duplexer 123. The duplexer 123 radiates the radio signal provided form the transmitter 121 through an antenna ANT, and provides a radio signal received through the antenna to a receiver 125. The receiver 125 demodulates the radio signal provided from the duplexer 123 and provides the demodulated signal to the controller 111. The controller 111 controls a call according to the provided radio signal. A display 127, which is typically implemented by an LCD (Liquid Crystal Display) or an LED (Light Emitting Diode), displays control data and input data of the portable radio telephone, under the control of the controller 111.

FIG. 2 shows a menu table included in the portable radio telephone by way of example.

Referring to FIG. 2, the menu table includes 9 main menus, which include a volume control menu having a main menu index #1, a utility menu having a main menu index #2, a system setup menu having a main menu index #3, an alert menu having a main menu index #4, an air time (or call time) menu having a main menu index #5, a security menu having a main menu index #6, a display menu having a main menu index #7, a time setting menu having a main menu index #8, and a voice recognition menu having a main menu index #9. The main menus each include their sub-menus as shown. For example, the volume control menu #1 includes a bell volume sub-menu having a sub-menu index #1, a key tone volume sub-menu having a sub-menu index #2, and a speech volume sub-menu having a sub-menu index #3.

Figure 3:
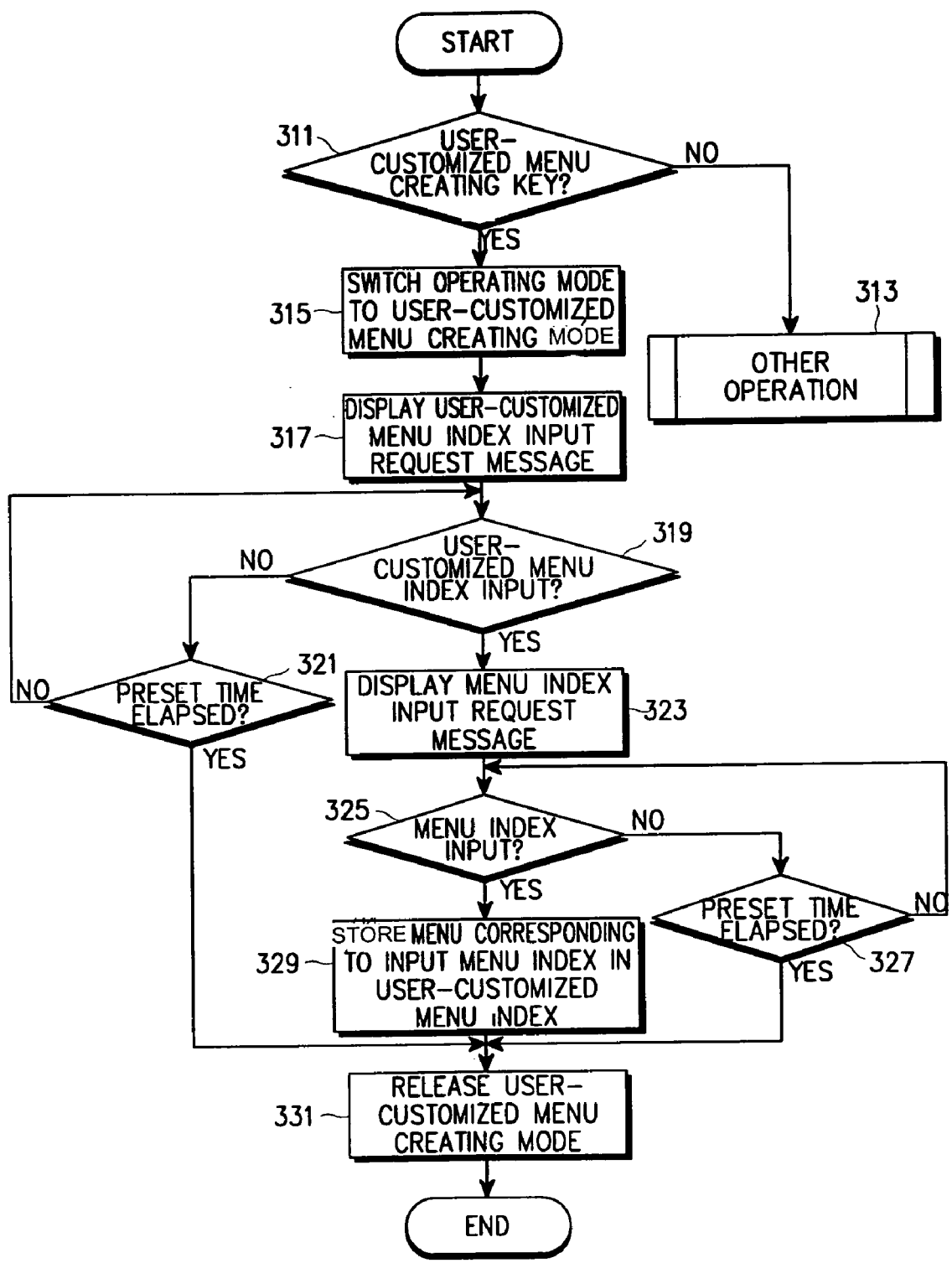
FIG. 3 is a flow chart illustrating a procedure for creating a user-customized menu according to an embodiment of the present invention.

FIG. 3 shows a procedure for creating a user-customized menu according to an embodiment of the present invention, and FIG. 4 shows a user-customized menu table according to an embodiment of the present invention, by way of example.

With reference to FIGS. 3 and 4, a detailed description will be made below regarding a procedure for creating the user-customized menu according to an embodiment of the present invention.

Upon receipt of a key signal provided from the key input unit 115, the controller 111 determines in step 311 whether the provided key signal is a user-customized menu creating key. If it is not a user-customized menu creating key, the controller 111 proceeds to step 313 where the controller 111 performs an operation corresponding to the key signal provided from the key input unit 115.

Otherwise, if the key signal provided from the key input unit 115 is the user-customized menu creating key, the controller 111 proceeds to step 315 where the controller 111 switches an operating mode of the portable radio telephone to a user-customized menu creating mode. Thereafter, in step 317, the controller 111 displays through the display 127 a user-customized menu index input request message stored in the memory 113 to request the user to input a desired user-customized menu index. For example, the message may be read "Please input a user-customized menu index."

In step 319, the controller 111 determines whether a key signal corresponding to a user-customized menu index is received from the key input unit 115. Upon failure to receive the user-customized menu index key signal, the controller 111 determines in step 321 whether a preset time (e.g., 5 seconds) has elapsed. If the preset time has not elapsed, the controller 111 returns to step 319. Otherwise, if the preset time has elapsed, the controller 111 proceeds to step 331, where the controller 111 releases the user-customized menu creating mode and then ends the program.

If, for example, the user-customized menu index #1 is received in step 319, the controller 111 proceeds to step 323 wherein the controller 111 displays through the display 127 a message requesting the user to input a corresponding menu index designating the menu contents to be stored in the received user-customized menu index. For example, the message may be read "Please input a desired menu index." Thereafter, the controller 111 determines in step 325 whether a key signal corresponding to a menu index is received from the key input unit 115. Upon failure to receive the menu index key signal, the controller 111 determines in step 327 whether a preset time (e.g., 5 seconds) has elapsed. If the preset time has not elapsed, the controller 111 returns to step 325. Otherwise, if the preset time has elapsed, the controller 111 proceeds to step 331, where the controller 111 releases the user-customized menu creating mode and then ends the program.

If, for example, a menu index #11 indicating a bell volume sub-menu is received in step 325, the controller 111 proceeds to step 329 where the controller 111 maps the received index to the menu, and stores the received user-customized menu index '11' in a user-customized menu storage area of the memory 113. Thereafter, in step 331, the controller 111 releases the user-customized menu creating mode and then ends the program.

As described with reference to FIGS. 3 and 4, it is possible to create a separate menu, i.e., the user-customized menu composed of the most frequently used service menus such as the bell volume menu, the bell select menu, the alarm setting menu, the initial screen menu, and the key tone volume menu.

Figure 5:
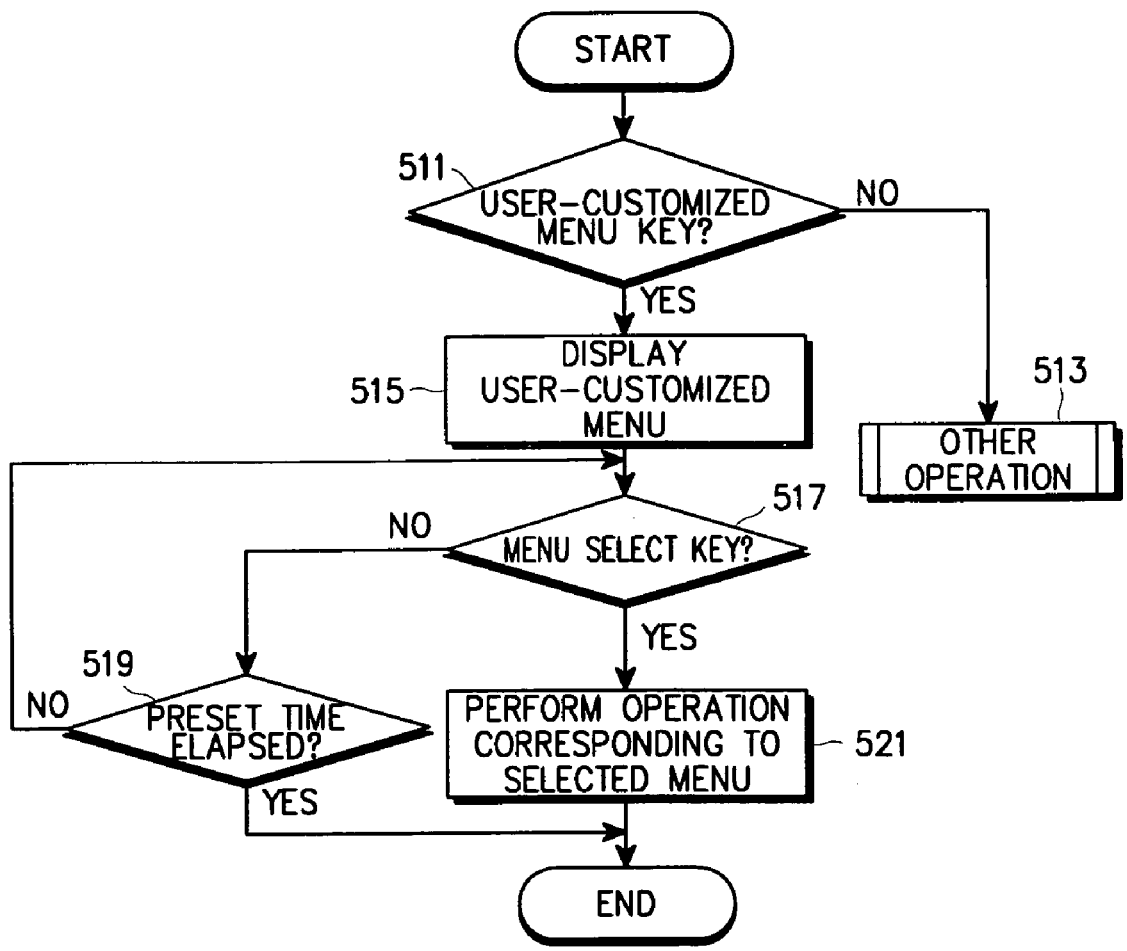
FIG. 5 is a flow chart illustrating a procedure for performing the user-customized menu according to an embodiment of the present invention.

FIG. 5 shows a procedure for performing the user-customized menu according to an embodiment of the present invention.

Referring to FIG. 5, upon receipt of a key signal provided from the key input unit 115, the controller 111 determines in step 511 whether the provided key signal is a user-customized menu key signal. If it is not the user-customized menu key signal, the controller 111 proceeds to step 513 whether the controller 111 performs an operation corresponding to the key signal provided from the key input unit 115.

If, however, the key signal provided from the key input unit 115 is the user-customized menu key signal in step 511, the controller 111 proceeds to step 515 where the controller 111 reads out a previously created user-customized menu from the user-customized menu storage area of the memory 113 and displays the read user-customized menu on the display 127. Thereafter, the controller 111 determines in step 517 whether a menu select key is received from the key input unit 115. Here, the "menu select key" refers to an alphanumeric key corresponding to the user-customized menu index previously set in the user-customized menu. For example, in FIG. 4, the bell volume menu is set to the user-customized menu index #1, so that a menu select key for selecting the bell volume menu becomes '1'.

Upon failure to receive the menu select key in step 517, the controller 111 proceeds to step 519 where the controller 111 determines whether a preset time (e.g., 5 seconds) has elapsed. If the preset time has not elapsed, the controller 111 returns to step 517. Otherwise, if the preset time has elapsed, the controller 111 ends the program.

However, upon receipt of the menu select key from the key input unit 115 in step 517, the controller 111 proceeds to step 521 where the controller 111 performs an operation corresponding to the menu selected according to the menu select key signal and then ends the program.

As described above, the portable radio telephone according to the present invention can create a user-customized menu composed of frequently used service menus, making it possible for the user to quickly search the frequently used menus and input the searched menu with a reduced number of key strokes. In addition, the user can freely create his unique customized menu personally. Thus, the novel portable radio telephone offers convenience to the user.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for creating a user-customized menu in a portable radio telephone having a menu table in which service menus for a user are stored in association with corresponding indexes, the method comprising the steps of:

upon receipt of a user-customized menu creating key, switching an operating mode of the portable radio telephone to a user-customized menu creating mode;

receiving a user-customized menu index in the user-customized menu creating mode;

after receiving the user-customized menu index, receiving a main menu index or a sub-menu index; and after receiving the menu index, or the submenu index, storing the main menu index or the submenu index in association with the user-customized menu index.

2. The method as claimed in claim 1, wherein said menu index is a service menu index stored in the menu table.

3. The method as claimed in claim 1, further comprising the step of displaying a message for requesting the user to input a desired user-customized menu index after switching the operating mode of the portable radio telephone to the user-customized menu creating mode.

4. The method as claimed in claim 1, further comprising the step of displaying a message for requesting the user to input a menu index desired to be input as menu contents in association with the received user-customized menu index.

5. A method for creating a user-customized menu in a portable radio telephone, comprising the steps of:

upon receipt of a user-customized menu creating key, switching an operating mode of the portable radio telephone to a user-customized menu creating mode;

displaying a user-customized menu index input request message for requesting a user to input a user-customized menu index of a desired user-customized menu;

after displaying the user-customized menu index input request message, receiving a user-customized menu index from the user;

displaying a menu index input request message for requesting the user to input a menu index corresponding to user-customized menu contents desired to be stored in the received user-customized menu index;

after displaying the menu index input request message, receiving from the user a main menu index or a sub-menu index; and storing the received menu index in association with the user-customized menu index.

6. The method as claimed in claim 5, wherein the menu index is an index of a service menu previously stored in the portable radio telephone.

7. The method as claimed in claim 5, further comprising the step of releasing the user-customized menu creating mode after storing the menu index in association with the user-customized menu index.

8. A method for creating a user-customized menu in a portable radio telephone, comprising the steps of:

creating a menu table by designating menu indexes corresponding to service menus for a user;

upon receipt of a user-customized menu creating request from the user to create a user-customized menu, switching an operating mode of the portable radio telephone to a user-customized menu creating mode;

upon receipt of an index to be designated for the user-customized menu in the user-customized menu creating mode, receiving a service menu selected a by inputting a main menu index or a sub-menu index and mapping the received index to the service menu; and storing the mapped service menu in the menu table in association with the index received for the user-customized menu.

9. The method as claimed in claim 8, further comprising the step of releasing the user-customized menu creating mode after creating the user-customized menu table.

* * * * *